(12) United States Patent
Nakatsuji

(10) Patent No.: US 6,327,263 B1
(45) Date of Patent: *Dec. 4, 2001

(54) ON-VEHICLE MULTIPLEX COMMUNICATION SYSTEM AND MANUFACTURING METHOD THEREOF

(75) Inventor: Naohiro Nakatsuji, Nagoya (JP)

(73) Assignees: Harness System Technologies, Nagoya; Sumitomo Wiring Systems, Ltd., Mie; Sumitomo Electric Industries, Ltd., Osaka, all of (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/189,976

(22) Filed: Nov. 12, 1998

(30) Foreign Application Priority Data

Nov. 21, 1997 (JP) .................................................. 9-321425

(51) Int. Cl.⁷ ..................................................... H04J 3/00
(52) U.S. Cl. ........................................... 370/442; 307/10.1
(58) Field of Search ..................................... 370/359, 407, 370/425, 462, 449, 360, 111, 441, 442, 438, 445; 340/825.07, 825.08, 825.51, 184, 164; 307/10.1, 9.1

(56) References Cited

U.S. PATENT DOCUMENTS

| 4,554,461 | * | 11/1985 | Oho et al. .......................... 307/10 R |
| 4,652,853 | * | 3/1987 | Tagamt et al. ........................ 340/52 |
| 4,845,708 | | 7/1989 | Herrmann, Jr. et al. .............. 370/85 |
| 4,887,263 | * | 12/1989 | Steely ................................. 307/10 R |
| 5,408,227 | * | 4/1995 | Hirayabashi et al. .......... 340/825.06 |
| 5,499,247 | * | 3/1996 | Matsuda et al. ....................... 370/445 |
| 5,504,737 | * | 4/1996 | Ichii et al. ............................. 370/242 |
| 5,623,169 | | 4/1997 | Sugimoto et al. . |
| 5,736,793 | | 4/1998 | Jahrsetz et al. . |
| 6,006,143 | * | 12/1999 | Bartel et al. ............................. 701/1 |

FOREIGN PATENT DOCUMENTS

| 0365435 A2 | 4/1990 | (EP) . |
| 0365435 A3 | 4/1990 | (EP) . |
| 0 714 812 A2 | 6/1996 | (EP) . |
| 0773650 A2 | 5/1997 | (EP) . |
| A-8-4414 | 1/1996 | (JP) . |
| A-9-118182 | 5/1997 | (JP) . |
| WO 94/26558 | 11/1994 | (WO) . |

* cited by examiner

Primary Examiner—Douglas Olms
Assistant Examiner—Ken Vanderpuye
(74) Attorney, Agent, or Firm—Oliff & Berridge, PLC

(57) ABSTRACT

In a multiplex communication system, as to all of the vehicles, the arbitrarily-mounted apparatuses can be connected to the transmission path, and also only the arbitrarily-mounted apparatus having the specific output circuit is separately and selectively can be connected to the transmission path, depending upon such a specific attribute condition when the individual vehicle is supplied, and this specific output circuit is suitable for this specific attribute condition. Accordingly, as the arbitrarily-mounted apparatus suitable for the respective attribute conditions, all of the output functions, all of the output functions which are not required for these attribute conditions can be excluded, and the useless output circuits can be omitted, resulting in a cost reduction. Thus, it is possible to realize the space-saving on-vehicle multiplex communication system. At the same time, only the minimum number of arbitrarily-mounted apparatus is merely added so as to change the other vehicle sorts and the other vehicle destination regions.

19 Claims, 12 Drawing Sheets

ON-VEHICLE MULTIPLEX COMMUNICATION SYSTEM AND MANUFACTURING METHOD THEREOF

BACKGROUND OF THE INVENTION

The present invention is related to an on-vehicle multiplex communication system and a manufacturing method thereof, in which a multiplex communication is carried out via a predetermined transmission path among a plurality of multiplex communication apparatuses mounted inside an automobile.

Very recently, various sorts of electronic components mounted on automobiles are introduced. Under such circumstances, various on-vehicle multiplex communication systems capable of communicating plural sorts of signals via a small number of transmission line paths are considerably employed in order to manipulate a large number of output component groups functioning as these vehicle electronic components by a large number of input component groups such as switches.

As a conventional on-vehicle multiplex communication system, there is a distribution-process type on-vehicle multiplex communication system (first prior art) in which each of plural multiplex communication apparatuses owns an input/output circuits, and the respective multiplex communication apparatuses make decisions and function controls. In this first conventional on-vehicle multiplex communication system, the on-vehicle multiplex communication systems are independently designed in accordance with the individual attribute conditions such as vehicle sorts and vehicle destination regions, and both the minimum required input function and the minimum required output function, which are suitable for this attribute condition, are restrictedly applied to design the on-vehicle multiplex communication system. In other words, the first conventional on-vehicle multiplex communication systems are designed on the basis of minimizing total cost of the systems with respect to each of the attribute conditions.

As another prior art communication system, there is such an on-vehicle multiplex communication system (second prior art). That is, input circuits and output circuits, which are capable of accepting all of attribute conditions respectively, are previously set in a plurality of multiplex communication apparatuses. Also, while any one of these multiplex communication apparatuses is employed as a master and all of other multiplex communication apparatuses are used as slaves, only the master apparatus issues a command to all of the slave apparatuses based on its decision so as to control the functions of the slave apparatuses. -This second conventional on-vehicle multiplex communication system owns a major aspect, namely general-purpose characteristics of this communication system rather than total cost of this communication system. Even when the input circuits and the output circuits are unused,- no specific measure is taken in order that the second conventional on-vehicle multiplex communication system can be quickly designed to accept an additional function and a vehicle destination region in a flexible manner.

In the first conventional on-vehicle multiplex communication system, since the unnecessary elements as the input/output elements as to the attribute conditions such as the respective vehicle sorts and the respective vehicle destination regions can be excluded as being permitted as possible, the total cost of this communication can be minimized. However, the completely different on-vehicle multiplex communication apparatuses must be independently developed sodas to accept the attribute conditions such as other vehicle sorts, and other vehicle destination regions. Thus, the developing efficiency of these multiplex communication apparatuses is very lowered.

On the other hand, the second conventional on-vehicle multiplex communication system can relatively flexibly accept other vehicle sorts and other vehicle destination regions, but must install the input circuits and the output circuits, which own the all functions as to the vehicles having all of the attribute conditions. Therefore, a large number of extra, namely unused input/output circuits are required for the system cost. This may cause difficulty in view of reducing the system cost. In particular, as to the output circuit for driving/switching the load, the power electronic elements such as electromagnetic relays may be usually utilized. Thus, the employment of the output circuit capable of realizing all functions adaptable for all vehicles would cause the main factor to increase the system cost.

For instance, the following assumption is required with respect to a certain vehicle destination region (will be referred to as a "first vehicle destination region" hereinafter), specific functions such as foot lamps for respective seats and storage mirrors are required in addition to common output elements (namely, output elements required irrespective of attribution conditions) such as power windows, door locks, and room lamps. On the other hands, the following assumption is required for another vehicle destination region (will be referred to as a "second vehicle destination region" hereinafter), a trunk lid open function is required as a specific function in addition to the common output elements such as power windows, door locks, and room lamps. In this case, the functional differences for both the vehicle destination regions are given as follows: For the first vehicle destination region, there are required the foot lamp function of the seats and the storage mirror function, whereas for the second vehicle destination region, the trunk lid open function is required.

FIG. 10 is a block diagram for indicating the first conventional on-vehicle multiplex communication system provided for the above-explained first vehicle destination region. In this on-vehicle multiplex communication system, distribution type multiplex communication apparatuses 71 to 73 are connected in a bus line manner to a transmission path 74 routed within an automobile. The respective multiplex communication apparatuses 71 to 73 are mutually connected via this transmission path 74 by using a preselected communication system such as a frequency division multiplexing system, a time division multiplexing system, and a code division multiplexing system. In this case, driving motors 75 for the power windows and the door locks are connected to the respective multiplex communication apparatuses 71 to 73. Also, a room lamp 76 is connected to one multiplex communication apparatus 71 (for example, multiplex communication apparatus arranged on driver-sided seat). These driving motors 75 and room lamp 76 are provided as the common output elements required irrespective of the attribute conditions. In contrast, foot lamps 77 for seats and a motor 78 for storing a mirror are provided as the specific function element for the first vehicle destination region in this automobile. As a consequence, output circuits for driving/switching the foot lamps 77 and the motor 78 for storing the mirror are formed also in the respective multiplex communication apparatuses 71 to 73, if required. It should be noted that reference numeral 79 shown in FIG. 10 indicates switches such as a door lock switch and a power window operating switch.

Also, FIG. 11 is a block diagram for indicating the first conventional on-vehicle multiplex communication system provided for the above-explained second vehicle destination region. In this on-vehicle multiplex communication system, distribution type multiplex communication apparatuses 81 to 83 are connected in a bus line manner to a transmission path 84 routed within an automobile. The respective multiplex communication apparatuses 81 to 83 are mutually connected via this transmission path 84. In this case, the common output elements such as a room lamp 86 and driving motors 85 for the power windows and the door locks are connected to the respective multiplex communication apparatuses 81 to 83. Also, a trunk lid unlocking motor 87 for opening a trunk lid is provided as the specific function element for the second vehicle destination region. However, nofoot lamps and motors for storing mirrors are not connected to the respective multiplex communication apparatuses 81 to 83, which is different from the first vehicle destination region (FIG. 10). It should also be noted that reference numeral 89 shown in FIG. 11 indicates switches such as a door lock switch and a power window operating switch.

As apparent from comparison between FIG. 10 and FIG. 11, the respective multiplex communication apparatuses 71 to 73 suitable for the first vehicle destination region, and also the respective multiplex communication apparatuses 81 to 83 suitable for the second vehicle destination region do not own the common point. Therefore, the completely different circuits must be designed, depending upon the attribute conditions such as the vehicle destination regions.

Also, FIG. 12 is a block diagram for indicating the second conventional on-vehicle multiplex communication system. In this on-vehicle multiplex communication system, multiplex communication apparatuses 91 to 93 are mutually connected in a bus line manner to a transmission path 94. In this case, the common output elements such as driving motors 95 for the power windows and the door locks are connected to the respective multiplex communication apparatuses 91 to 93. Also, foot lamps 97 for seats and a motor 98 for storing a mirror are provided as the specific function element for the first vehicle destination region, and at the same time, a trunk lid unlock motor 99 for opening a trunk lid is provided as the specific function element for the second vehicle destination region. This second conventional on-vehicle multiplex communication system can be provided for any of the vehicle destination regions. Conversely, in other words, all of such functions become unnecessary when the attribute conditions such as the vehicle destination region are changed. As a result, a large number of useless circuits are employed in all of the vehicles. There is a problem that the total cost is increased.

SUMMARY OF THE INVENTION

Therefore, an object of the present invention is to provide a low-cost on-vehicle multiplex communication system and a method for manufacturing such a low-cost on-vehicle multiplex communication system capable of readily accepting other vehicle sorts and other vehicle destination regions.

To solve the above-described problems, an on-vehicle multiplex communication system, according to the present invention, is featured by such an on-vehicle multiplex communicating system for performing a multiplex communication by way of a distribution process operation among a plurality of multiplex communication apparatuses mounted on a vehicle via a predetermined transmission path, the multiplex communication apparatus comprising: an essentially-mounted apparatus mounted on all of vehicles irrespective of attribute conditions containing a vehicle sort condition and a vehicle destination region condition, and an arbitrarily-mounted apparatus arbitrarily and selectively mounted in correspondence with each of the attribute conditions, in that the essentially-mounted apparatus is connected to the transmission path, and includes an input circuit capable of connecting all of input elements acquired in response to all of the attribute conditions; a common output circuit capable of connecting only a common output element which is commonly required in all of the attribute conditions; and a control circuit for drive-controlling the common output circuit;

the arbitrarily-mounted apparatus is separately and selectively connected to the transmission path, and includes a specific output circuit capable of connecting only a specific functional element suitable for a specific attribute condition among the attribute conditions when a vehicle is supplied, and a control circuit for drive-controlling the specific output circuit; and the multiplex communication is performed via the transmission path between the essentially-mounted apparatus and the arbitrarily-mounted apparatus in response to an input signal of the input circuit so as to drive-control the common output circuit and the specific output circuit.

Preferably, the above-described the arbitrarily-mounted apparatus further includes an input circuit capable of connecting an input element which is required to autonomous-define a sleep condition under which the operation of the specific output circuit is stopped only for a predetermined time period.

Then, when the on-vehicle multiplex communication system is manufactured, as to all of vehicles, the arbitrarily-mounted apparatus is connected to the transmission path; and only an arbitrarily-mounted apparatus having the specific output circuit suitable for the specific attribute condition is separately and selectively connected to the transmission path in response to the specific attribute condition when the individual vehicle is supplied.

DETAILED DESCRIPTION OF THE PREFERRED EMBODIMENTS

Figure 1:
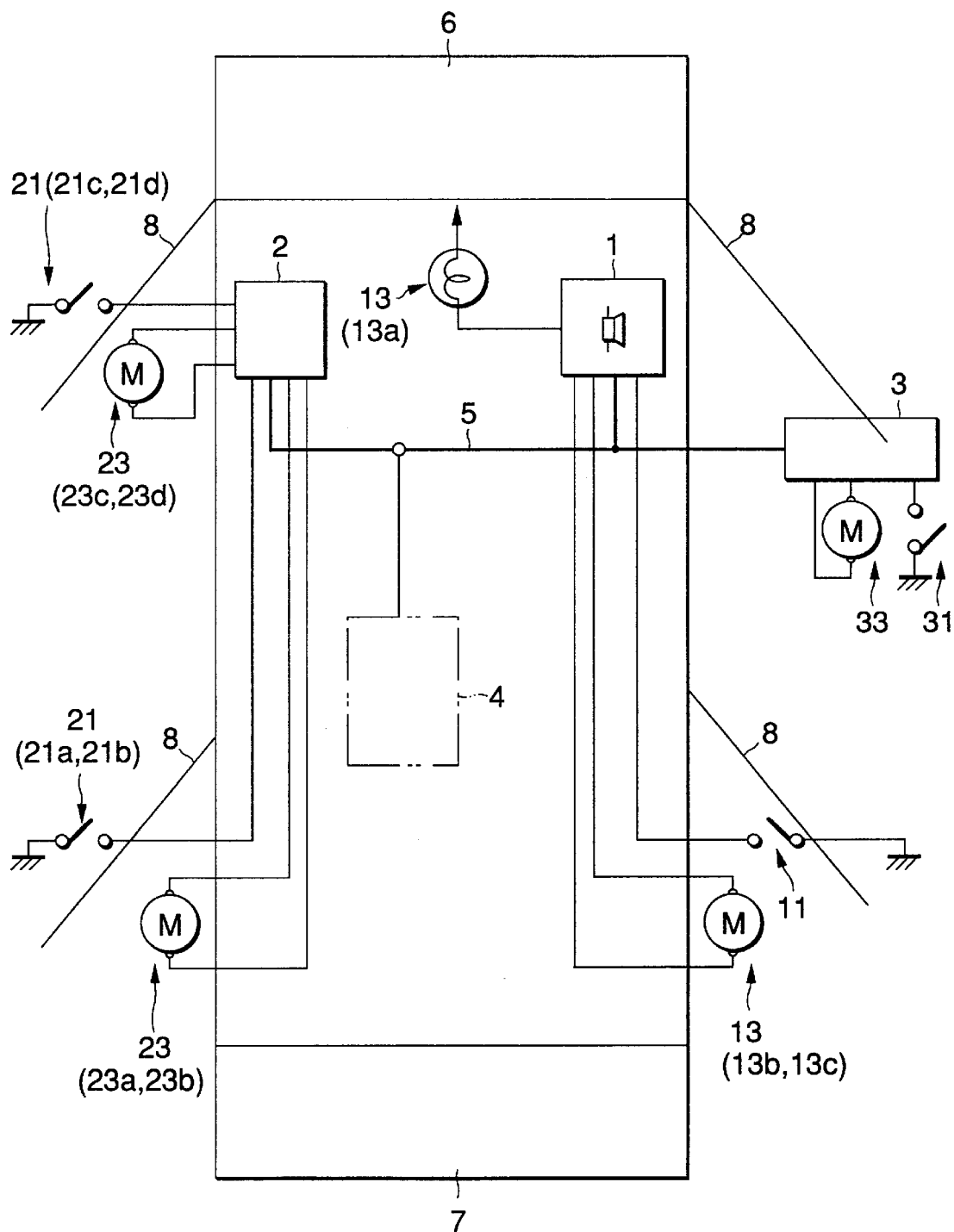
FIG. 1 is a block diagram for schematically showing an automobile on which an on-vehicle multiplex communication system according to an embodiment mode of the present invention is mounted.

FIG. 1 is a schematic block diagram for schematically representing an automobile on which an on-vehicle multiplexing communicating system according to an embodiment mode of the present invention. It should be noted that FIG. 1 is an arrangement diagram when the automobile is viewed from an upper side, and an arrangement of the respective multiplex communication apparatuses 1 to 4 within the automobile is set. Reference numeral 6 indicates a front nose portion of a car body, reference numeral 7 shows a rear trunk portion of the car body, and reference numeral 8 represents a door.

This on-vehicle multiplex communication system is constituted in a similar manner to that of the first prior art. That is, each of the plural multiplex communication apparatuses 1 to 4 contains an input circuit and an output circuit, and mutual transmission/reception judgements are performed in a distributed manner. However, this on-vehicle multiplex communication system is featured as follows; The plural multiplex communication apparatuses 1 to 4 are classified into essentially-mounted apparatuses 1 to 3, and an arbitrarily-mounted apparatus 4. The essentially-mounted apparatuses 1 to 3 are mounted on all of vehicles irrespective of a vehicle sort, a vehicle destination region, and the like, whereas the arbitrarily-mounted apparatus 4 is arbitrarily and selectively mounted in accordance with an individual vehicle sort and an individual vehicle destination region. For the more, as the input circuits employed in the essentially-mounted apparatuses 1 to 3, such input circuits are used on which input elements (all input elements) of signals required for all of the vehicle sorts and also for all of the vehicle destination regions are previously mounted. As, the output circuits employed in the essentially-mounted apparatus 1 to 3, such an output circuit is used on which only an output element (common output element) commonly used for all of the vehicle sorts and all of the vehicle destination regions is mounted. The arbitrarily-mounted apparatus 4 may be arbitrarily and selectively mounted, if necessary, with respect to a transmission path 5 to which these essentially-mounted apparatuses 1 to 3 are connected.

Figure 2:
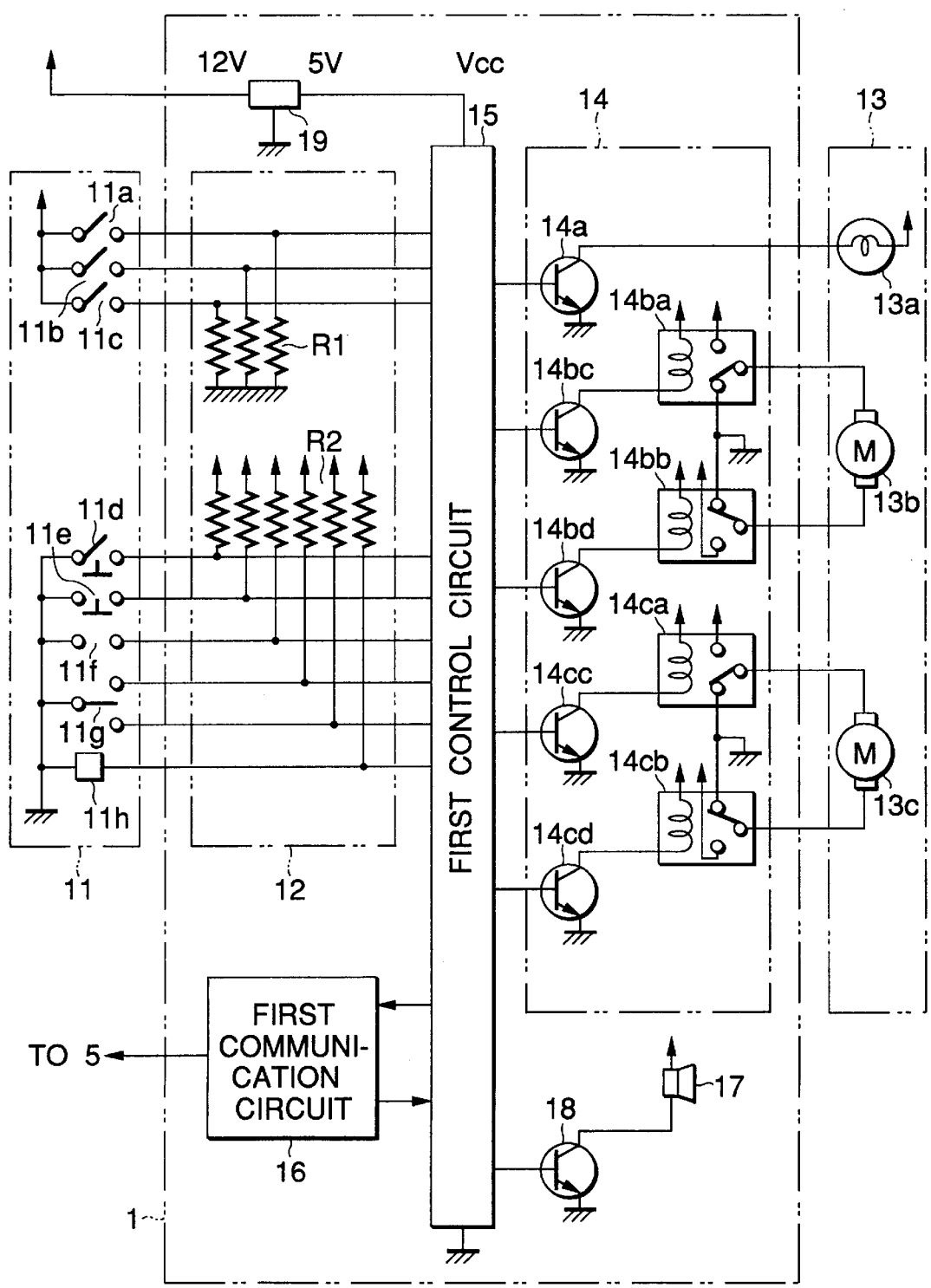
FIG. 2 is a circuit block diagram for indicating a first essentially-mounted apparatus.

The first essentially-mounted apparatus 1 is mounted, specifically speaking, in the vicinity of a right side of a rear seat (for example, within a pillar between a driver seat and a rear seat) of a vehicle, or within a vehicle floor. As indicated in FIG. 2, the first essentially-mounted apparatus 1 is arranged by a first input circuit 12 connected to an input component group 11 such as a plurality of switches and a plurality of sensors; a first output circuit 14 (common output circuit) connected to an output component group 13 such as various sorts of lamps and various sorts of motors; a first control circuit 15 for controlling the first input circuit 12 and the first output circuit 14; and a first communication circuit 16 connected to this first control circuit, for inputting/outputting communication data to/from a transmission path 5.

The input component group 11 connected to this first essentially-mounted apparatus 1 may accept all of input elements in order to be adaptable to any of vehicle sorts and all of vehicle destination regions. Concretely speaking, this input component group 11 is arranged by an ignition switch 11a for turning ON a main power supply by turning an ignition key within a key cylinder; a small light switch 11b for instructing turn-ON/OFF of a small light such as a clearance light installed within the vehicle; and a vehicle is driven backwardly. Also, the input component group 11 is further arranged by a rear-seat right-sided door switch 11d for detecting open/close states of a door on the right side of the rear seat; an ignition key switch 11e for confirming as to whether or not the ignition key is present within the key cylinder; a seat belt switch 11f for detecting as to whether or not a seat belt of the driver seat is set; a rear-seat right-sided door locking state detecting switch 11g for detecting locking/unlocking states of a right-sided door of a rear seat; and a vehicle speed sensor 11h for sensing a drive speed of a vehicle. Then, one terminals of a portion of these input components 11a to 11c are connected to a battery, and the other terminals thereof are connected to the first input circuit 12. one terminals of other input components 11d to 11h are connected to the ground, and the other terminals thereof are connected to the first input circuit 12.

The first input circuit 12 is to transfer signals derived from the various sorts of input components 11a to 11h provided within the input component group 11 to the first control circuit 15. The other terminals of a portion of the input components 11a to 11c connected to the battery are connected via a resistor R1 to the ground, whereas the other terminals of other input components 11d to 11h are connected via a register R2 to the battery.

The output component group 13 may accept only the output. elements which are commonly applied to all of the vehicle sorts and all of the vehicle destination regions. Concretely speaking, this output component group 13 is constituted by a room lamp 13a, a rear-seat right sided door lock motor 13b, and a rear-seat right-sided power window motor 13c. Then, one terminal of the room lamp 13a is connected to the battery, and also the other terminal thereof is connected to the first output circuit 14. The respective motors 13b and 13c are connected to the first output circuit 14 in such a manner that both terminals thereof are connected to this first output circuit 14, taking account of the normal/reverse driving operations.

The first output circuit 14 is constructed of a transistor 14a for turning ON/OFF the room lamp 13a of the output component group 13 in response to an instruction signal derived from the first control circuit 15; and relays 14ba, 14bb, 14ca, 14db connected to both terminals of the respective motors 13b, 13c, for switching the normal/reverse driving operations of these motors; and further transistors 14bc, 14bd, 14cc, 14cd for switching the respective relay 14ba, 14bb, 14cc, 14cd.

The first control circuit 15 detects an input signal derived from the input component group 11 and acquired via the input circuit 12, and thereafter controls the first output circuit 14, if required (for example, door lock instruction etc.), and performs a signal synthesizing operation and a signal discriminating operation in accordance with a preselected communication system such as the frequency dividing/multiplexing system, the time division multiplexing system, and the code division multiplexing system. Then, the first control circuit 15 transmits/receives a signal via the communication circuit 16 to/from the transmission path 5. It should be noted that a buzzer 17 and a transistor 18 turning ON/OFF this buzzer 17 are connected to the first control circuit 15, and further a transformer 19 for transforming a power supply voltage applied from the battery is connected to this first control circuit 15. The buzzer 17 is operated when the ignition switch is turned ON while the seat belt is not yet set, and the vehicle is driven backwardly.

The first communication circuit 16 transmits/receives a signal to/from the first control circuit 15, and also inputs/outputs a signal to/from the transmission path 5.

Figure 3:
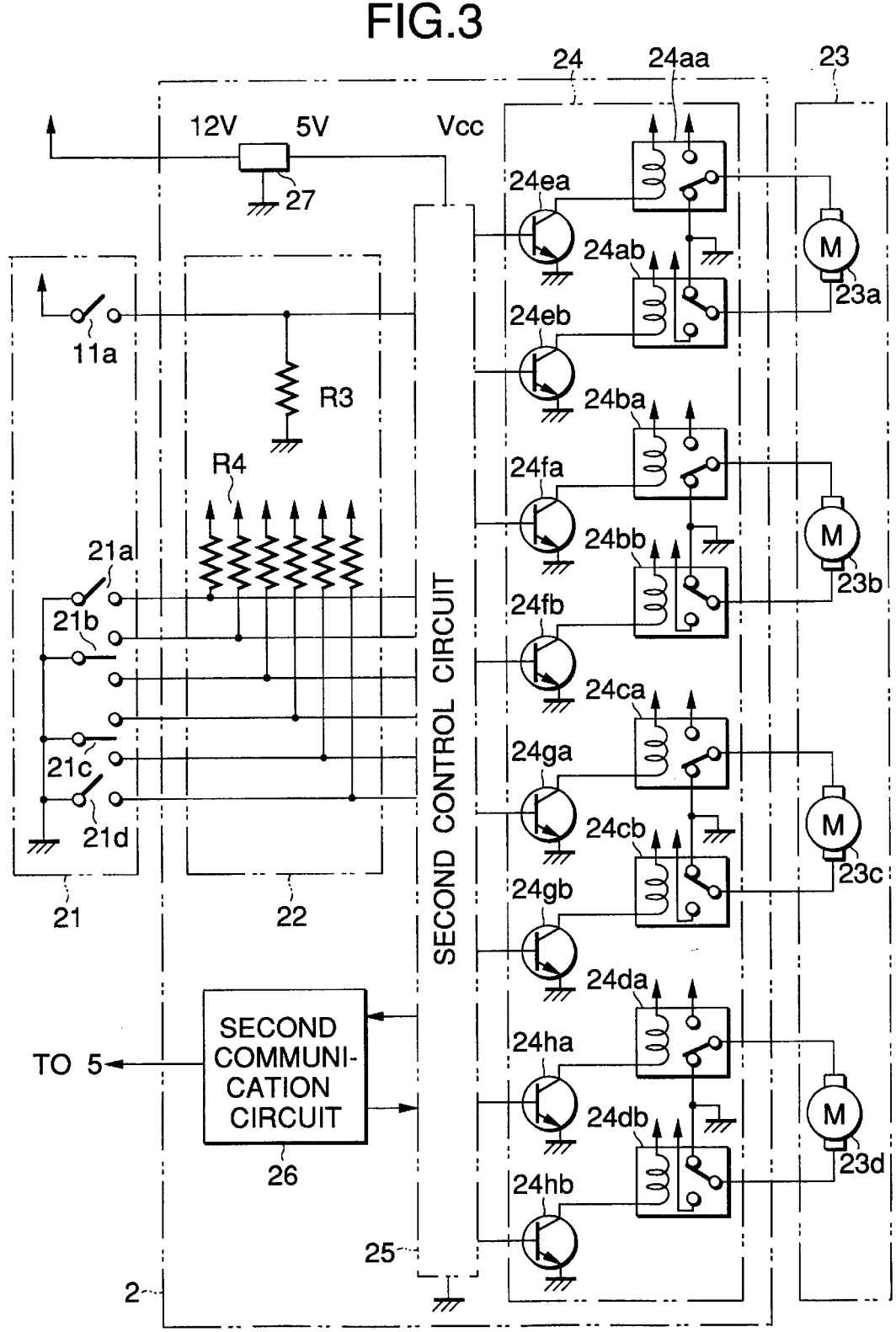
FIG. 3 is a circuit block diagram for indicating a second essentially-mounted apparatus.

The second essentially-mounted apparatus 2 is mounted, concretely speaking, in the vicinity of a left side of a passenger seat (for example, within a pillar between a passenger seat and a rear seat) of a vehicle, or within a vehicle floor. As indicated in FIG. 3, the second essentially-mounted apparatus 2 is arranged by a second input circuit 22 connected to an input component group 21 such as a plurality of switches and a plurality of sensors; a second output circuit 24 (common output circuit) connected to an output component group 23 such a various sorts of lamps and various sorts of motors; a second control circuit 25 for controlling the second input circuit 22 and the second output circuit 24 and a second communication circuit 26 connected to this second control circuit, for inputting/outputting communication data to/from a transmission path 5.

Similar to the input component group 11 connected to the above-described first essentially-mounted apparatus 1, the input: component group 21 connected to this second essentially-mounted apparatus 2 may accept all of input elements in order to be adaptable to any of vehicle sorts and all of vehicle destination regions. Concretely speaking, the input component group 21 is arranged by the ignition switch 11a commonly used with the input component group 11 of the first essentially-mounted apparatus 1; a rear-seat left-sided door switch 21a for detecting open/close states of a left-sided door of a rear seat; a rear-seat left-sided door locking-state detecting switch 21b for detecting locking/unlocking states of the left-sided door of the rear seat; a passenger-seat door locking-state detecting switch 21c for detecting locking/unlocking states of the door of the passenger-seat; and also a passenger-seat door switch 21d for detecting open/close states of the door of the passenger-seat. Then, one terminal of the ignition switch 11a is connected to the battery, and also the other terminal thereof is connected to the second input circuit 22. One terminals of other input components 21a to 21d are connected to the ground, and also the other terminals thereof are connected to the second input circuit 22.

The second input circuit 22 is to transfer signals derived from the various sorts of input components 11a and 21a to 21d provided within the input component group 21 to the second control circuit 25. The other terminal of the ignition switch 11a connected to the battery are connected via a resistor R3 to the ground, whereas the other terminals of other input components 21a to 21d are connected via a resistor R4 to the battery.

Similar to the output component group 13 connected to the first essentially-mounted apparatus 1, the output component group 23 may accept only the output elements which are commonly applied to all of the vehicle sorts and all of the vehicle destination regions. Concretely speaking, this output component group 23 is constituted by a rear-seat left-sided door lock motor 23a, a rear-seat left-sided power window motor 23b, a passenger-seat door lock motor 23c, and a passenger-seat power window motor 23d. Then, the respective motors 13b and 13c are connected to the second output circuit 24 in such a manner that both terminals thereof are connected to this second output circuit 24, taking account of the normal/reverse driving directions.

The second output circuit 24 is arranged by relays 24aa to 24db, and transistors 24ea, 24eb to 24ha, and 24hb. The relays 24aa to 24db are connected to both terminals of the respective motors 23a to 23d of the output component group 23, and switch the normal/reverse driving operations in response to an instruction issued from the second control circuit 25. The transistors 24ea, 24eb to 24ha, 24hb switch the respective relays 24aa, 24ab to 24da, 24db.

The second control circuit 25 detects an input signal derived from the input component group 22 and acquired via the input circuit 22, and thereafter controls the second output circuit 24, if required (for example, door lock instruction etc.), and performs a signal synthesizing operation and a signal discriminating operation in accordance with a preselected communication system such as the frequency dividing/multiplexing system, the time division multiplexing system and the code division multiplexing system. Then, the second control circuit: 25 transmits/receives a signal via the communication circuit 26 to/from the transmission path 5. It should be noted that a transformer 27 for transforming a power supply voltage applied from the battery is connected to this second control circuit 25.

The second communication circuit 26 transmits/receives a signal to/from the second control circuit 25, and also inputs/outputs a signal to/from the transmission path 5.

Figure 4:
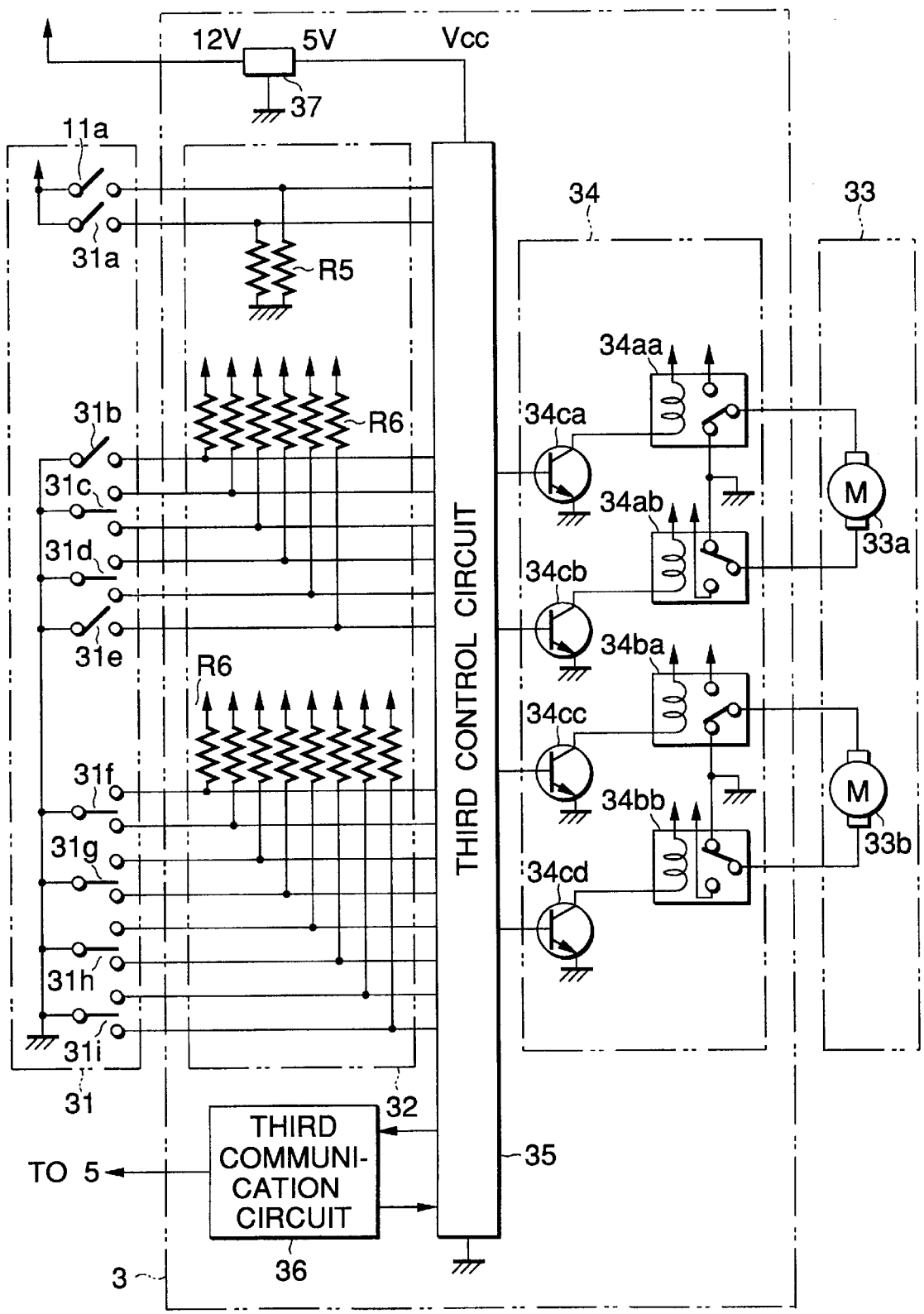
FIG. 4 is a circuit block diagram for indicating a third essentially-mounted apparatus.

The third essentially-mounted apparatus 3 is mounted, concretely speaking, in the vicinity of a driver seat within an arm rest formed on a driver-seat door of a vehicle (for example, within a pillar positioned in from right direction), or within a vehicle floor. As indicated in FIG. 4, the third essentially-mounted apparatus 3 is arranged by a third input circuit 32 connected to an input component group 31 such as a plurality of switches and a plurality of sensors; a third output circuit 34 (common output circuit connected to an output component group 33 such as various sorts of lamps and various sorts of motors; a third control circuit 35 for controlling the third input circuit 33 and the third output circuit 34; and a third communication circuit 36 connected to this third control circuit 35, for inputting/outputting communication data to/from a transmission path 5.

Similar to the input component group 11 connected to the above-described first essentially-mounted apparatus 1, the input component group 31 connected to this third essentially-mounted apparatus 3 may accept all of input elements in order to be adaptable to any of vehicle sorts and all of vehicle destination regions. Concretely speaking, the input component group 31 is arranged by he ignition switch 11a commonly used with the input component group 11 of the first essentially-mounted apparatus 1; a storage mirror switch 31a for storing a door mirror in a remote control; a trunk lid open switch 31b for unlocking a trunk lid; a driver-seat door locking operation switch 31c for switching door locking/unlocking operations of the driver seat; a driver-seat door locking state detecting switch 31d for detecting door locking/unlocking states of the driver-seat door; a driver-seat door switch 31e for detecting open/close states of the driver-seat door; and driver-seat power window switches 31f to 31i for opening/closing windows of the respective seats. Then, one terminals of the input components 11a and 31a are connected to the battery, and also the other terminals thereof are connected to the third input circuit 32. One terminals of other input components 31b to 31i are connected to the ground and also the other terminals thereof are connected to the third input circuit 32.

The third input circuit 32 is to transfer signals derived from the various sorts of input components 11a, 31a to 31i provided within the input component group 31 to the third control circuit 35. The other terminals of a portion of the input components 11a and 31a connected to the battery are connected via a resistor R5 to the ground, whereas the other terminals of other input components 31b to 31i are connected via a resistor R6 to the battery.

The output component group 33 may accept only the output elements which are commonly applied to all of the vehicle sorts and all of the vehicle destination regions. Concretely speaking, this output component group 33 is constituted by a driver-seat door lock motor 33a, and a driver-seat power window motor 33b. Then, the respective motors 33a and 33b are connected to the third output circuit 34 in such a manner that both terminals thereof are connected to this third output circuit 34, taking account of the normal/reverse driving directions.

The third output circuit 34 is arranged by relays 34aa, 34ab, 34ba, 34bb, and transistors 34ca, 34db, 34da, 34db. The relays 34aa, 34ab, 34ba, 34bb are connected to both terminals of the respective motors 33a and 33b of the output component group 33, and switch the normal/reverse driving operations in response to an instruction issued from the third control circuit 35. The transistors 34ca, 34db, 34da, 34db switch the respective relays 34aa, 34ab, 34ba, 34bb.

The third control circuit 35 detects an input signal derived from the input component group 31 and acquired via the input circuit 33, and thereafter controls the third output circuit 34, if required (for example, door lock instruction etc.), and performs a signal synthesizing operation and a signal discriminating operation in accordance with a preselected communication system such as the frequency dividing/multiplexing system, the time division multiplexing system, and the code division multiplexing system. Then, the third control circuit 35 transmits/receives a signal via the communication circuit 36 to/from the transmission path 5. It should be noted that a transformer 37 for transforming a power supply voltage applied from the battery is connected to this third control circuit 35.

The third communication circuit 36 transmits/receives a signal to/from the third control circuit 35, and also input/output a signal to/from the transmission path 5.

With respect to the transmission path 5 to which the above-explained first essentially-mounted apparatus 1, second essentially-mounted apparatus 2, and third essentially-mounted apparatus 3, as represented in FIG. 1, the arbitrarily-mounted apparatus 4 is arbitrarily and selectively connected, taking account of the various aspects such as the vehicle sorts and the vehicle destination regions.

This arbitrarily-mounted apparatus 4 is separately and. specifically mounted, depending upon the vehicle sorts and the vehicle destination regions. The arbitrarily-mounted apparatus 4 is mainly arranged by such an output circuit for driving/controlling an output component installed, if required. The reason why the arbitrarily-mounted apparatus 4 is mainly arranged by the output circuit is given as follows. The cost of this output circuit is relatively higher than that of the respective input components, since this output circuit processes the drive current required to drive the various sorts of output components as the lock. Since the output circuit which is not required in accordance with a certain vehicle sort and a certain vehicle destination region may be excluded, the overall cost may be reduced.

Next, a description will now be made of two embodiments, depending upon such different arbitrarily-mounted apparatuses 4. An on-vehicle multiplex communication system of a first embodiment is suitable for a first vehicle destination region (namely, communication system requires output functions of foot lamps for seats and of storage mirror), whereas an on-vehicle multiplex communication system of a second embodiment is suitable for a second vehicle destination region (namely, communication system requires output function of trunk lid open). In the respective on-vehicle multiplex communication systems, input circuits thereof can accept all of input functions, and output circuits thereof exclude all of unnecessary output functions. As a consequence, it is possible to provide such advantageous multiplex communication system, in view of cost and space. Moreover, when a vehicle sort and a vehicle destination region are changed, only the minimum number of multiplex communication apparatus is merely added. The respective embodiments will now be described in detail.

First Embodiment

Figure 5:
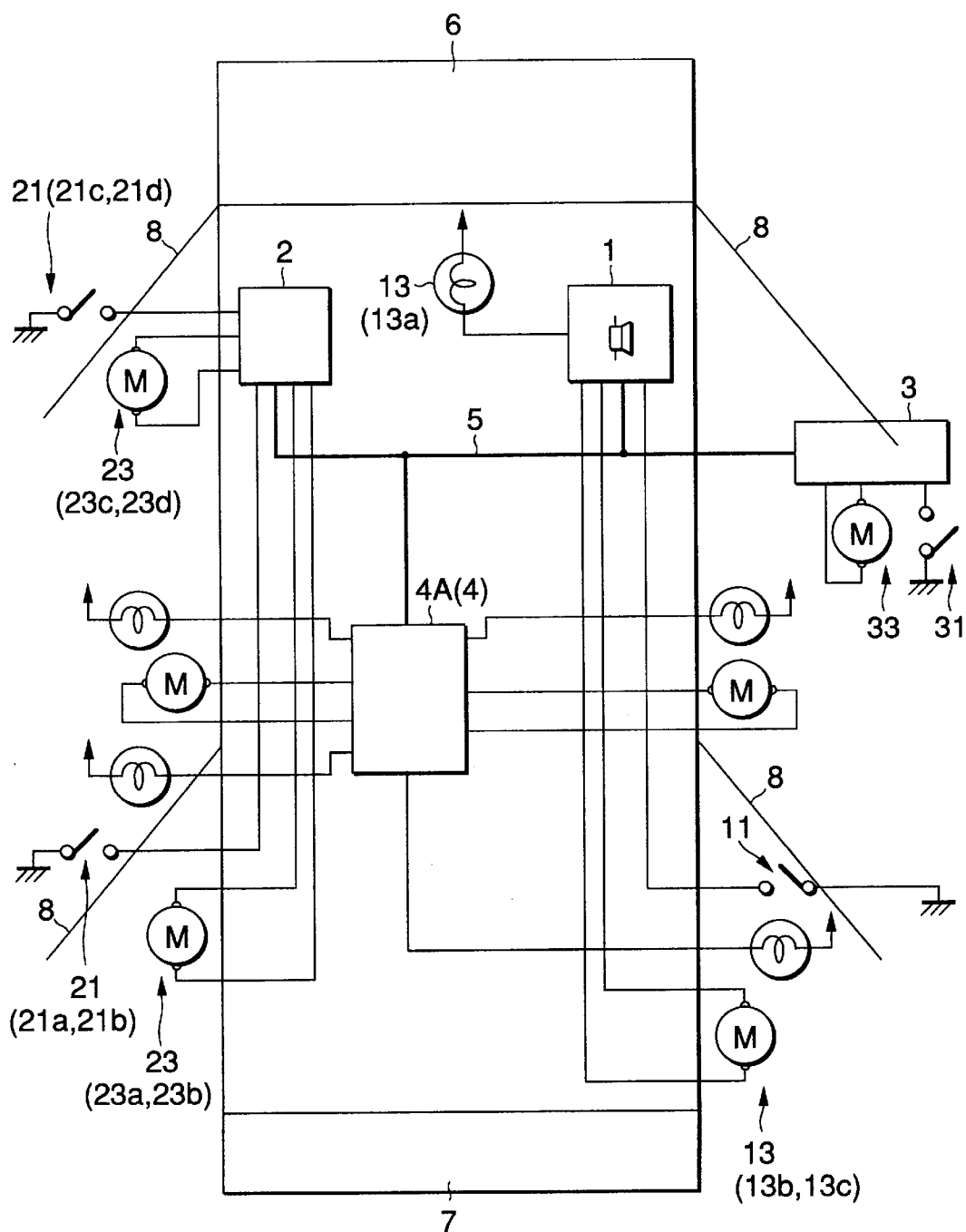
FIG. 5 is a block diagram for schematically showing a condition of an automobile under which a first arbitrarily-mounted apparatus is counted in an on-vehicle multiplex communication system according to a first embodiment of the present invention.

FIG. 5 is a schematic block diagram for showing element arrangements of an automobile, as viewed from an upper direction, on which the on-vehicle multiplex communication system according to the first embodiment of the present invention is mounted. It should be noted that the same reference numerals shown in FIG. 1 will be employed as those for denoting elements having similar functions.

This automobile is provided for the first vehicle destination region as explained in the prior art. This automobile owns the various functions of power windows, door locks, room lamps, foot lamps of seats, and storage mirrors. In other words, this automobile owns the function of the foot lamps for the respective seats, and the function of the storage mirror instead of the trunk lid open function with respect to the automobile directed to the second vehicle destination region, as previously explained in the prior art.

As previously explained with reference to FIG. 1 to FIG. 4, the first to third essentially mounted apparatuses 1 to 3 are mounted on all of vehicles irrespective of the vehicle sorts and the vehicle destination regions. In this embodiment, a description of these essentially-mounted apparatuses is omitted.

Figure 6:
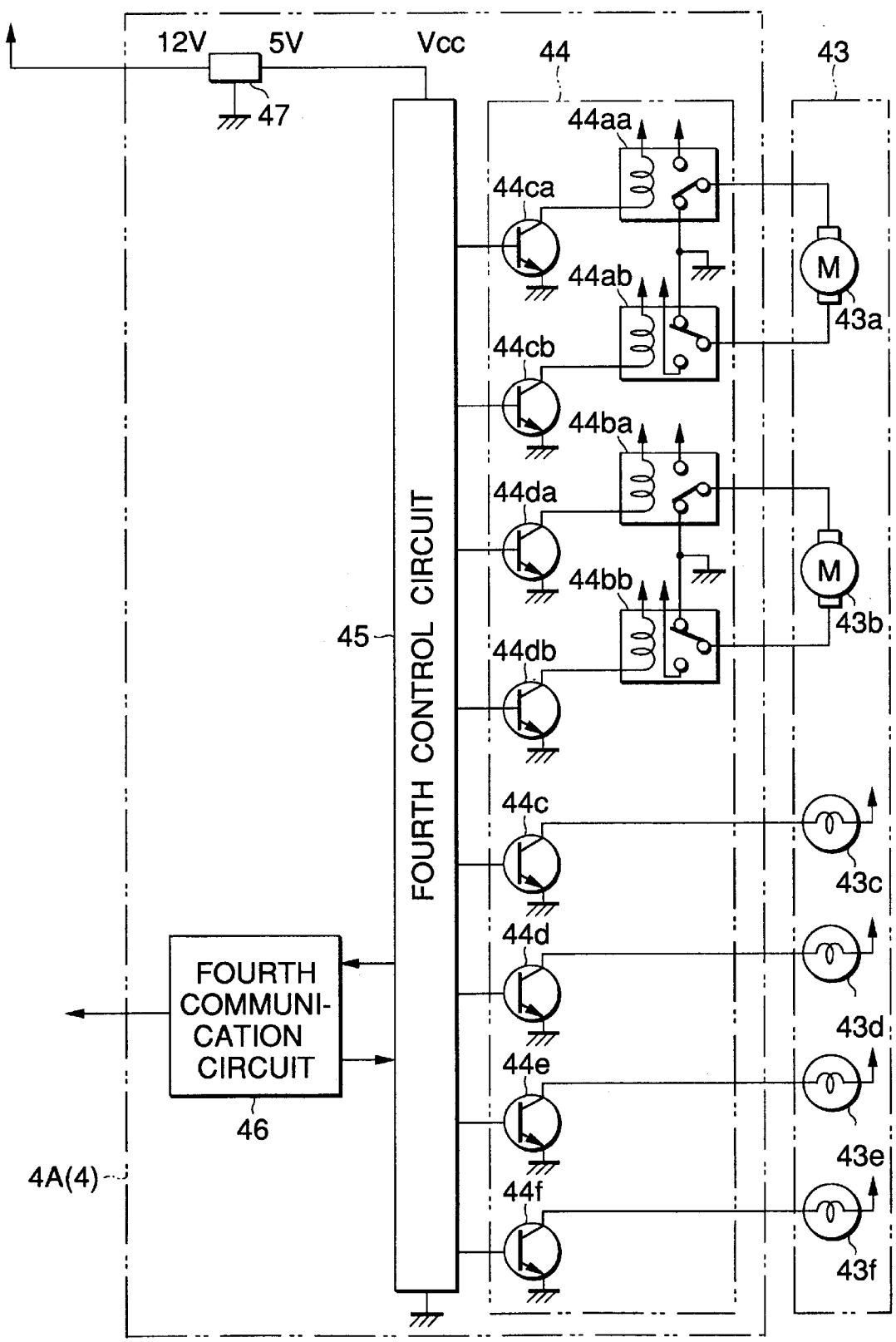
FIG. 6 is a circuit block diagram for indicating an example of the first arbitrarily-mounted apparatus according to the first embodiment.

In this embodiment, an arbitrarily-mounted apparatus 4 (will be referred to as a "first arbitrarily-mounted apparatus 4A" hereinafter) which is arbitrarily and selectively connected to a transmission path 5 is equipped with a fourth output circuit 44 (specific output circuit); a fourth control circuit 45; and a fourth communication circuit 46. As indicated in FIG. 6, the fourth output circuit 44 is connected to an output component group 43 such as various sorts of lamps and various sorts of motors. The fourth control circuit 45 drives/controls these lamps and motors. The fourth communication circuit 46 is connected to this fourth control circuit 45 and inputs/outputs communication data between the transmission path 5 and the own fourth communication circuit 46.

The output component group 43 is a component group having an individual specific function suitable for the first vehicle destination region. Concretely speaking, this output component group 43 is constituted by storage mirror motors 43a, 43b on both right/left sides, and foot lamps 43c to 43f of the respective seats. Then, both terminals of the respective motors 43a and 43b are connected to the fourth output circuit 44, taking account of the normal/reverse driving operations. One terminals of the respective foot lamps 43c to 43f are connected to the battery, and also the other terminals thereof are connected to the fourth output circuit 44.

The fourth output circuit 44 is arranged by relays 44aa, 44ab, 44ba, 44bb; transistors 44ca, 44db, 44da, 44db; and further transistors 44c to 44f. The relays 44aa, 44ab, 44ba, and 44bb are connected to both terminals of the respective motors 43a and 43b of the output component group 43, and switch the normal/reverse driving operations in response to an instruction issued from the fourth control circuit 45. The transistors 44ca, 44db, 44da, and 44db switch the respective relays 44aa, 44ab, 44ba, 44b. The transistors 44c to 44f turn ON/OFF the respective lamps 43c to 43f.

The fourth control circuit 45 performs a signal synthesizing operation and a signal discriminating operation in accordance with a preselected communication system such as the frequency dividing/multiplexing system, the time division multiplexing system, and the code division multiplexing system. Then, the fourth control circuit 45 transmits/receives a signal via the fourth communication circuit 46 to/from the transmission path 5, and controls the fourth output circuit 44. It should be noted that a transformer 47 for transformingapower supply voltage applied from the battery is connected to this fourth control circuit 45.

The fourth communication circuit 46 transmits/receives a signal to/from the fourth control circuit 4, and also inputs/outputs a signal to/from the transmission path 5.

In this on-vehicle multiplex communication system, the multiplex communication is carried out among the first to third essentially-mounted apparatuses 1 to 3, and the first arbitrarily-mounted apparatus 4A in response to the inputs entered into the first to third essentially-mounted apparatuses 1 to 3, and the output component groups 13, 23, 33, 43 are properly driven.

In this on-vehicle multiplex communication system, as the first arbitrarily-mounted apparatus 4A suitable for the first vehicle destination region, all of the output functions (for example, trunk lid open function required only for second vehicle destination region) which are not required for the first vehicle destination region are excluded. Since the useless output circuit is omitted, the cost can be reduced, and the compact on-vehicle multiplex communication system can be realized.

It should be understood that in this on-vehicle multiplex communication, as previously described, since the third input circuit 32 of the third essentially-mounted apparatus 3 owns such a wiring structure capable of connecting the trunk lid open switch 31b, this communication system has such an input function which is not always required for the second vehicle destination region (see FIG. 4). However, since this structure need not require high cost and large space, the adverse influence caused by such a structure and given to the overall cost and space aspects is negligible. When the general-purpose third input circuit 32 is applied, cumbersome operation, e.g., selection of parts sort can be omitted.

Figure 7:
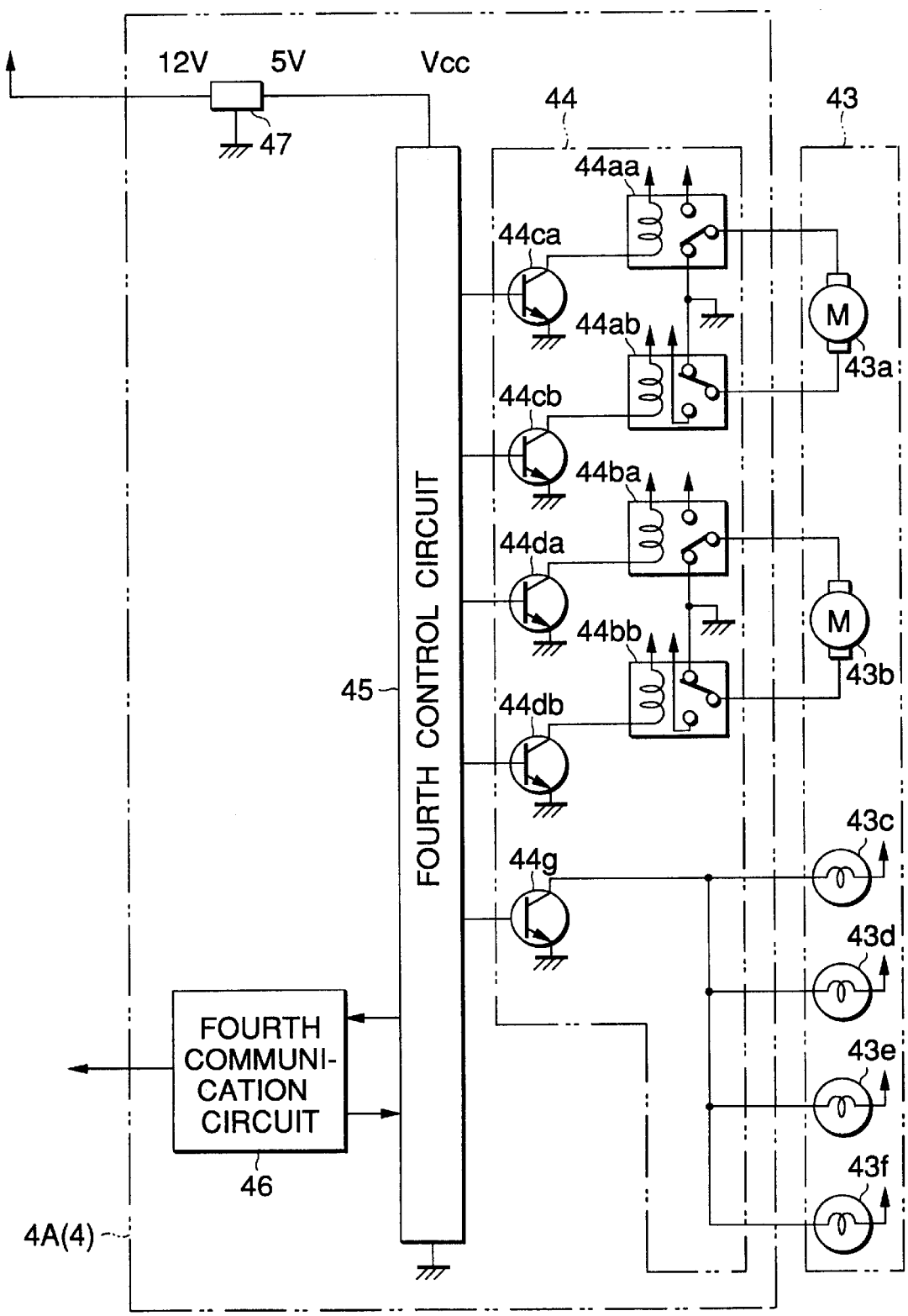
FIG. 7 is a circuit block diagram for showing another example of the first arbitrarily-mounted apparatus.

It should also be noted that 4 sets of transistors 44c to 44f are provided with respect to 4 sets of lamps 43c to 43f in the fourth output circuit 44 of the first arbitrarily-mounted apparatus 4A shown in FIG. 6. Alternatively, a plurality (4 sets) of lamps 43c to 43f may be driven/switched by a single transistor 44g as indicated in FIG. 7. In this alternative case, 4 sets of transistors (44c to 44f) may be replaced by one transistor (44g), which may give cost/space merits.

Second Embodiment

Figure 8:
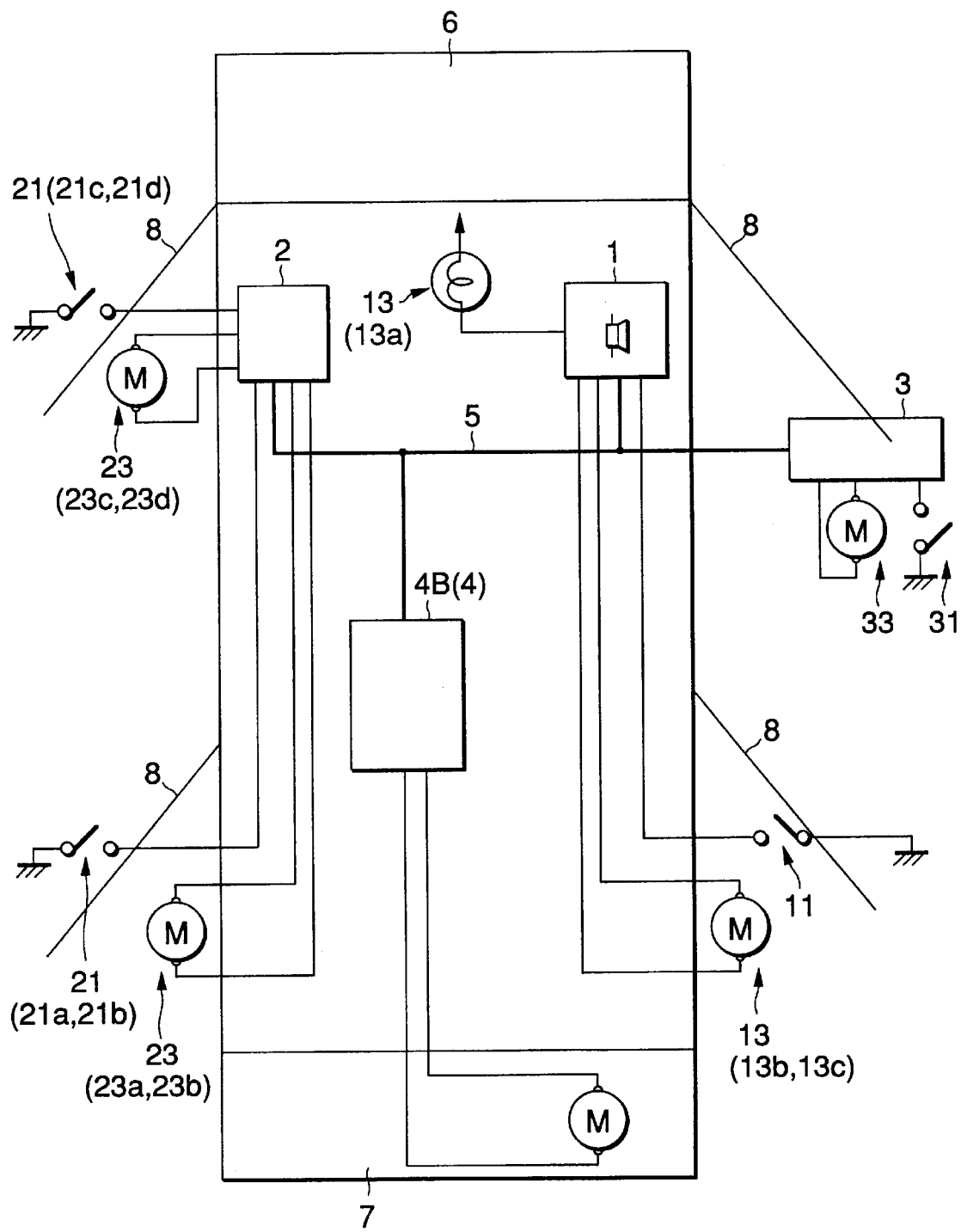
FIG. 8 is a block diagram for schematically showing a condition of an automobile under which a second arbitrarily-mounted apparatus is mounted in an on-vehicle multiplex communication system according to a second embodiment of the present invention.

FIG. 8 is a diagram for indicating an on-vehicle multiplex communication system according to a second embodiment of the present invention. It should be noted that the same reference numerals shown in FIG. 1 and FIG. 5 will be employed as those for denoting elements having similar functions in FIG. 8.

This automobile is provided for the second vehicle destination region as explained in the prior art. This automobile owns the various functions of power windows, door locks, room lamps, and trunk lid open. In other words, this automobile owns the function of the trunk lid open instead of the foot lamps of the respective seats and storage mirror function with respect to the automobile directed to the first vehicle destination region, as previously explained in the prior art, and the first embodiment.

As previously explained with reference to FIG. 1 to FIG. 4, the first to third essentially-mounted apparatuses 1 to 3 are mounted on all of the vehicles irrespective of the vehicle sorts and the vehicle destination regions, and explanations thereof are omitted.

Figure 9:
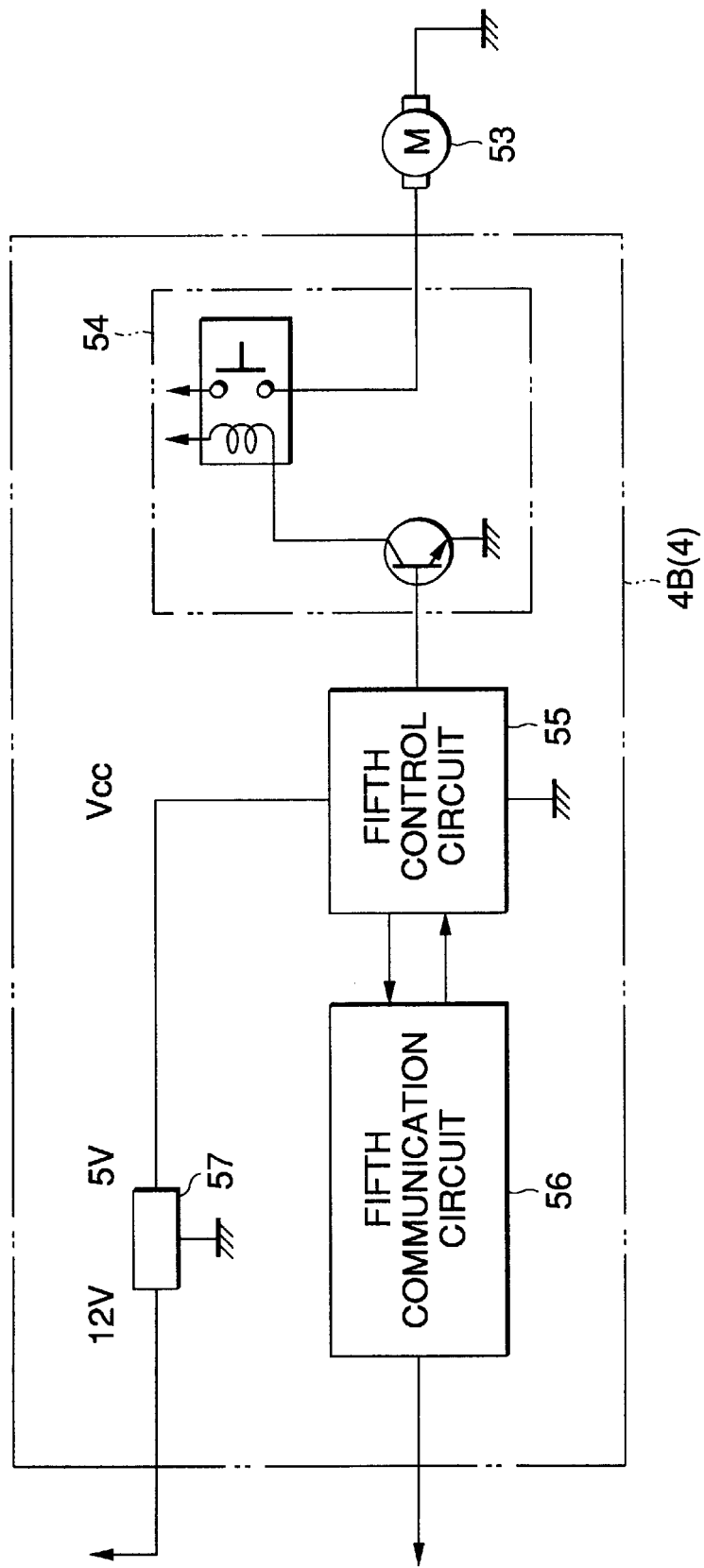
FIG. 9 is a circuit block diagram for indicating an example of the second arbitrarily-mounted apparatus according to the second embodiment.
Figure 10:
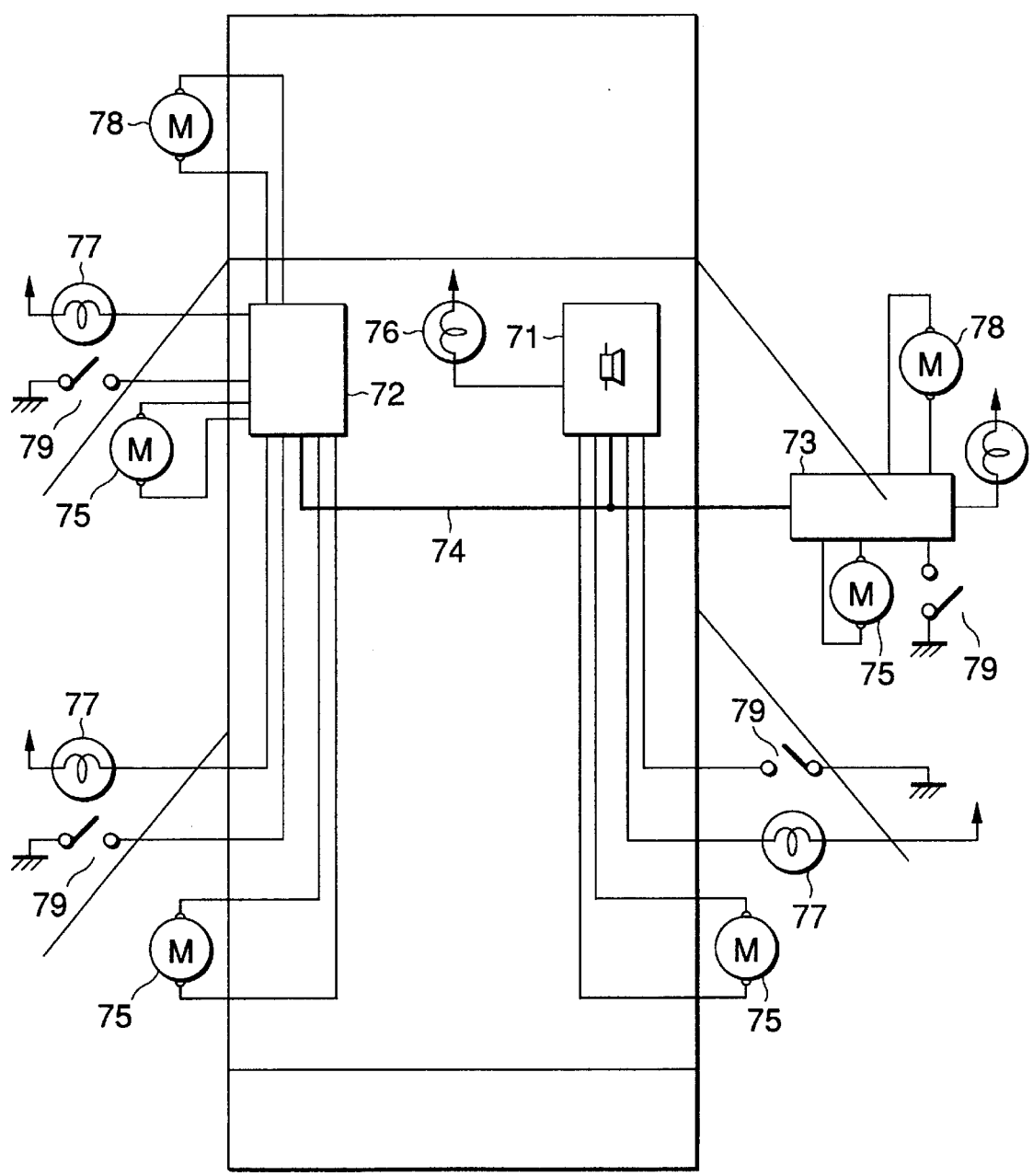
FIG. 10 is a circuit block diagram for showing the on-vehicle multiplex communication system of the first prior art suitable for a first vehicle destination region.
Figure 11:
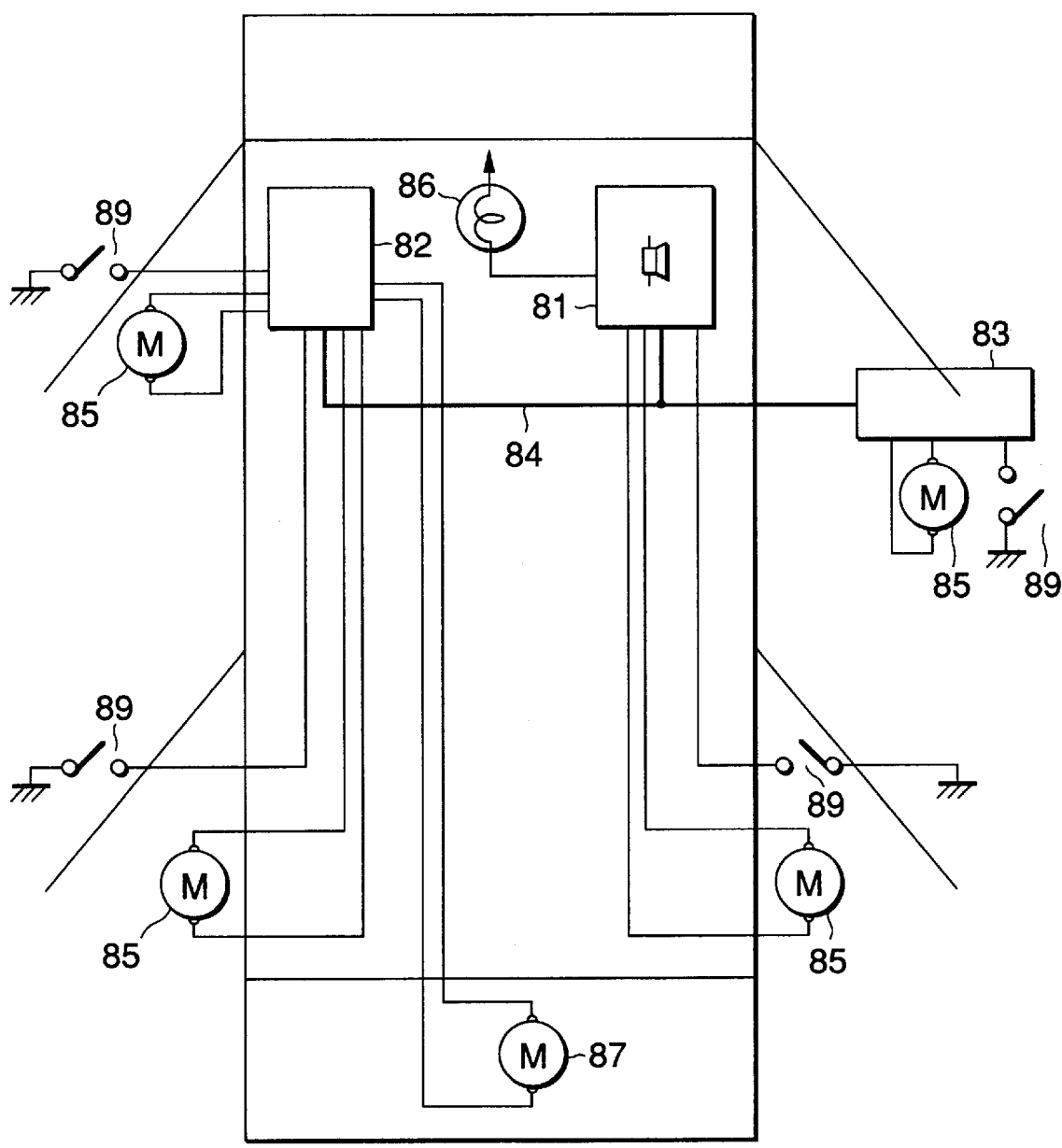
FIG. 11 is a block diagram for representing the on-vehicle multiplex communication system of the first prior art suitable for a second vehicle destination region.
Figure 12:
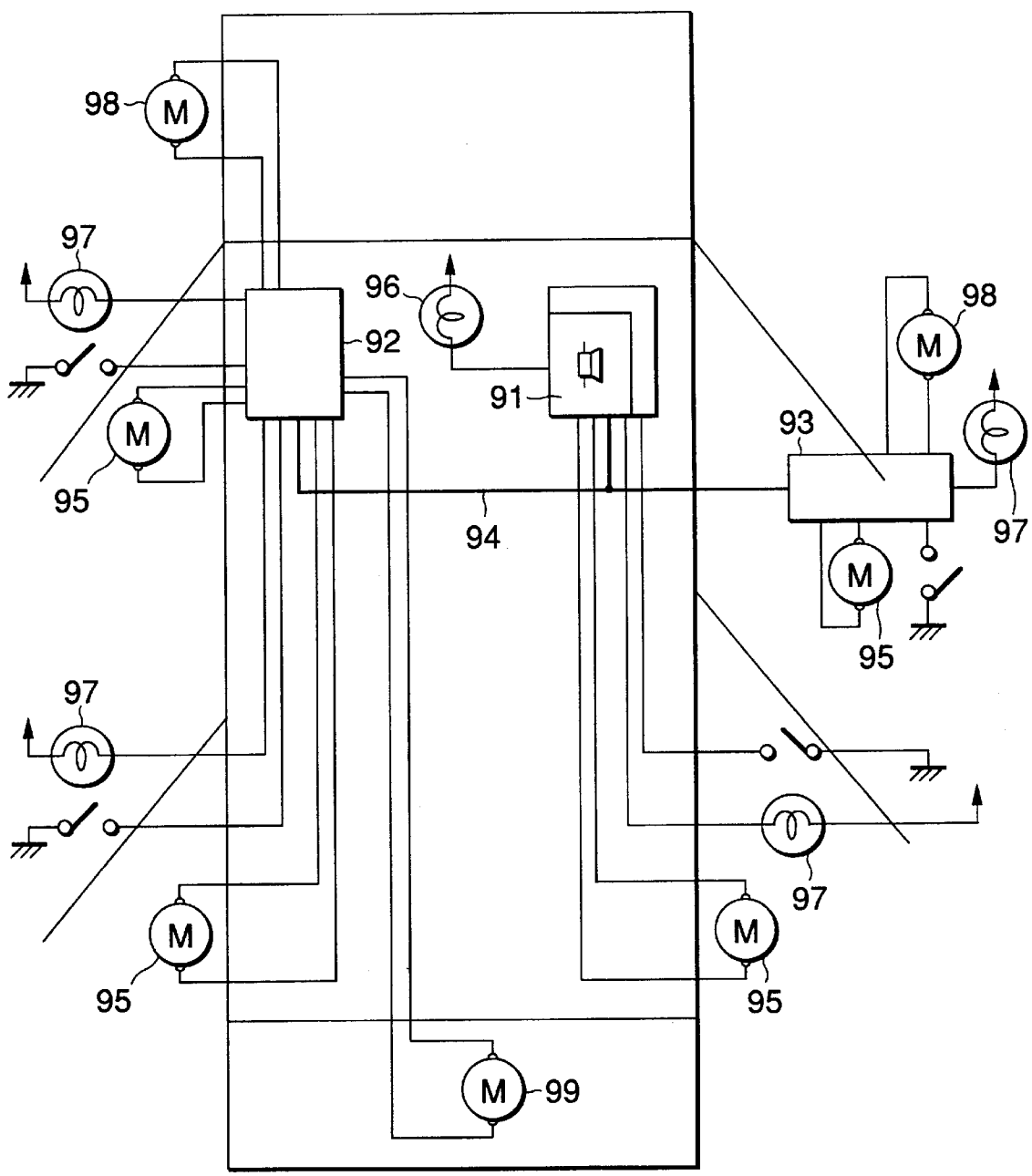
FIG. 12 is a block diagram for showing the on-vehicle multiplex communication system of the second prior art suitable for any of the first and second vehicle destination regions.

In this embodiment, an arbitrarily-mounted apparatus 4 (will be referred to as a "second arbitrarily-mounted apparatus 4B" hereinafter) which is arbitrarily and selectively connected to a transmission path 5 is equipped with a fifth output circuit 54 (specific output circuit); a fifth control circuit 55; and a fifth communication circuit 56. As indicated in FIG. 9, the fifth output circuit 54 is connected to a predetermined output component 53. The fifth control circuit 55 drives/controls these output components. The fifth communication circuit 56 connected to this fifth control circuit 55 and inputs/outputs communication data between the transmission path 5 and the own fifth communication circuit 56.

The output component 53 is a drive motor for unlocking a trunk lid, and is provided as a component having an individual specific function suitable for the second vehicle destination region. Then, one terminal of this drive motor 53 is connected to the ground, and the other terminal thereof is connected to the fifth output circuit 54.

The fifth output circuit 54 is arranged by a relay 54a and transistor 54b for switching this relay 54a. The relay 54a is connected to the other terminal of the drive motor 53, and drives this drive motor 53 in response to an instruction sent from the fifth control circuit 55.

The fifth control circuit 55 performs a signal synthesizing operation and a signal discriminating operation in accordance with a preselected communication system such as the frequency dividing/multiplexing system, the time division multiplexing system, and the code division multiplexing system. Then, the fifth control circuit 55 transmits/receives a signal via the fifth communication circuit 56 to/from the transmission path 5 and also controls the fifth output circuit 54. It should be noted that a transformer 57 for transforming a power supply voltage applied from the battery is connected to this fifth control circuit 55.

The fifth communication circuit 56 transmits/received a signal to/from the fifth control circuit 55, and also inputs/outputs a signal to/from the transmission path 5. In this on-vehicle multiplex communication system, the multiplex communication is carried out among the first to third essentially-mounted apparatuses 1 to 3, and the first arbitrarily-mounted apparatus 4B in response to the inputs entered into the first to third essentially-mounted apparatuses 1 to e, and the output component groups 13, 23, 33, 53 are properly driven.

In this on-vehicle multiplex communication system, as the second arbitrarily-mounted apparatus 4B suitable for the second vehicle destination region, all of the output functions (for example, foot lamps of seats and storage mirror function required only for first vehicle destination region) which are not required for the second vehicle destination region are excluded. Since the useless output circuit is omitted, the cost can be reduced, and the compact on-vehicle multiplex communication system can be realized. It should be understood that in this on-vehicle multiplex communication, as previously described, since the third input circuit 32 of the third essentially-mounted apparatus 3 owns such a wiring structure capable of connecting the storage mirror switch 13a, this communication system has such an input function which is not always required for the second vehicle destination region (see FIG. 4). However, since this structure need not require high cost and large space, the adverse influence caused by such a structure and given to the overall cost and space aspects is negligible.

As previously described, in accordance with the present invention, in the on-vehicle multiplex communication system, such a multiplex communication system having advantages in view of cost and space aspects can be set. Also, only the minimum number of multiplex communication apparatuses are merely and additionally employed in order to accept the changes in other vehicle sorts and other vehicle destination regions.

The above-explained on-vehicle multiplex communication systems are one of typical systems, and therefore, the functions maybe freely combined with each other, depending upon differences in the vehicle sorts and the vehicle destination regions.

Also, in the respective embodiments, the first and second arbitrarily-mounted apparatuses 4A and 4B are arranged without having the input circuit. Alternatively, for example, an input circuit connected to the ignition switch 11a and the like ;may be set, so that the condition of the vehicle is autonomously sensed to control irrespective of the multiplex communication signal supplied from the transmission path 5. In this alternative case, the respective arbitrarily-mounted apparatuses 4A and 4B may autonomously react not only the multiplex communication signal derived from the transmission path 5, but also the switch change of the ignition switch 11a when the sleep control is performed. In this sleep control, when the operation of the entire on-vehicle multiplex communication system is stopped only for a preselected time period, the operation mode is entered into the low power consumption mode in which power consumption of the battery is reduced.

In accordance with the invention, as to all of the vehicles, the arbitrarily-mounted apparatuses can be connected to the transmission path, and also only the arbitrarily-mounted apparatus having the specific output circuit is separately and selectively can be connected to the transmission path, depending upon such a specific attribute condition when the individual vehicle is supplied, and this specific output circuit is suitable for this specific attribute condition. Accordingly, as the arbitrarily-mounted apparatus suitable for the respective attribute conditions, all of the output functions, all of the output functions which are not required for these attribute conditions can be excluded, and the useless output circuits can be omitted, resulting in a cost reduction. Thus, it is possible to realize the space-saving on-vehicle multiplex communication system. At the same time, only the minimum number of arbitrarily-mounted apparatus is merely added so as to change the other vehicle sorts and the other vehicle destination regions.

On the other hand, as to the input circuit of each of the essentially-mounted apparatuses, this input circuit may process only very low current, as compared with the specific output circuit for mainly driving the various loads. As a result, the cost related to the respective components contained in the input circuit is very low, as compared with the component cost of the specific output circuit. Also, a large space is no longer required. The adverse influence given to the overall cost and the entire space is negligible. Since the general-purpose input circuit is applicable, such a cumbersome operation can be avoided, for example, a selection of a component sort.

In accordance with the invention, such an input circuit connectable with the input element required to autonomous-define the sleep condition is included in the on-vehicle multiplex communication apparatus. In this sleep condition, the operation of the arbitrarily mounted apparatus is stopped. As a consequence, there is such an effect that the respective arbitrarily-mounted apparatuses can respond to not only the multiplex communication signal supplied from the transmission path during the sleep condition, but also the autonomous-switching operation by the ignition switch.

What is claimed is:

1. An on-vehicle multiplex communication system for performing communication with a distributed process operation among a plurality of communication apparatus via a transmission path, said communication system comprising:

one or more essential communication apparatus commonly mountable on a vehicle being produced according to different attribute conditions;

one or more arbitral communication apparatus configured and separately provided to meet the specific needs of the vehicle and selectively mountable on the vehicle;

wherein said one or more essential communication apparatus is configured to be connected to the transmission path and include:

(a) one or more input circuits which are configured to correspond to all input elements of the vehicle having both said essential and said specific input elements, whereby said one or more input circuits are capable of connecting said all input elements;

(b) one or more essential output circuits which are configured to connect only essential output elements commonly required among all output elements of the vehicle, and (c) one or more control circuits which are configured to control the drive of each of said one or more essential output circuits;

wherein said one or more arbitral communication apparatus is configured to be connected to the transmission path and include:

(a) one or more specific output circuits which are configured to only connect one or more specific output elements required to drive only one or more specific functional elements particular to the specific needs of the vehicle, and (b) one or more control circuits which are configured to control the drive of each of said one or more specific output circuits; and wherein communication is performed via the transmission path between said one or more essential communication apparatus and said one or more arbitral communication apparatus in response to an input signal of each of said input circuits of said one or more essential communication apparatus to control at least one of said essential output circuits and said specific output circuits.

2. The on-vehicle multiplex communication system of claim 1, wherein at least one of the arbitrarily-mounted communication apparatus are responsive to a sleep condition request under which the operation of the specific output circuit is stopped for a predetermined time period.

3. The on-vehicle multiplexing communication system of claim 1, wherein the transmission path uses frequency division multiplexing.

4. The on-vehicle multiplexing communication system of claim 1, wherein the transmission path uses time division multiplexing.

5. The on-vehicle multiplexing communication system of claim 1, wherein the transmission path uses code division multiplexing.

6. The on-vehicle communication system of claim 1 wherein each essentially-mounted communication apparatus includes a plurality of output circuits adapted to drive output elements commonly used on all vehicle types.

7. The on-vehicle communication system of claim 1 wherein each essentially-mounted communication apparatus includes a plurality of output circuits adapted to drive output elements commonly used on all vehicle types.

8. The on-vehicle multiplexing system of claim 2, wherein the transmission path uses frequency division multiplexing.

9. The on-vehicle multiplexing system of claim 2, wherein the transmission path uses time division multiplexing.

10. The on-vehicle multiplexing system of claim 2, wherein the transmission path uses code division multiplexing.

11. The on-vehicle communication system of claim 2 wherein each essentially-mounted communication apparatus includes a plurality of output circuits adapted to drive output elements commonly used on all vehicle types.

12. The on-vehicle communication system of claim 2 wherein each essentially-mounted communication apparatus includes a plurality of output circuits adapted to drive output elements commonly used on all vehicle types.

13. The on-vehicle communication system of claim 1, wherein at least two arbitrarily mounted communication apparatus are optionally selected to be mounted on the vehicle in accordance with the needs of the vehicle type.

14. Manufacturing method for a multiplex communication system for performing communication via a transmission path, comprising:

producing one or more essential communication apparatus commonly mountable on a vehicle according to different attribute conditions;

wherein said one or more essential communication apparatus is configured for connection to the transmission path and includes:

configuring one or more input circuits to correspond to all input elements of the vehicle with both essential and specific input elements;

configuring one or more essential output circuits to connect only essential output elements commonly required among all output elements of the vehicle; and configuring one or more control circuits to control the drive of each of said one or more essential output circuits;

producing one or more arbitral communication apparatus configured to be separately provided to meet the specific needs the vehicle and selectively mountable on the vehicle;

wherein said one or more arbitral communication apparatus is configured for connection to the transmission path and includes:

configuring one or more specific output circuits to only connect one or more specific output elements required to drive only one or more specific functional elements particular to the specific needs of the vehicle; and configuring one or more control circuits to control the drive of each of said one or more specific output circuits; and wherein communication is performed via the transmission path between said one or more essential communication apparatus and said one or more arbitral communication apparatus in response to an input signal from each of said input circuits of said one or more essential communication apparatus to control at least one of said essential output circuits and said specific output circuits.

15. The manufacturing method for a communication system of claim 14 wherein the essentially-mounted communication apparatus includes a plurality of output circuits adapted to drive output elements commonly used on all vehicle types.

16. The manufacturing method for the communication system of claim 14, wherein at least two arbitrarily mounted communication apparatus are optionally selected to be mounted on the vehicle in accordance with the needs of the vehicle type.

17. Manufacturing method for a multiplex communication system for performing communication via a transmission path, comprising:

producing one or more essential communication apparatus commonly mountable on a vehicle according to different attribute conditions;

wherein said one or more essential communication apparatus is configured for connection to the transmission path and includes:

configuring one or more input circuits to correspond to all input elements of the vehicles with both essential and specific input elements;

configuring one or more essential output circuits to connect only essential output elements commonly required among all output elements of the vehicle; and configuring one or more control circuits to control the drive of each of said one or more essential output circuits;

producing one or more arbitral communication apparatus configured to be separately provided to meet the specific needs of the vehicle and selectively mountable on the vehicle;

wherein said one or more arbitral communication apparatus is configured for connection to the transmission path and includes:

configuring one or more specific output circuits to only connect one or more specific output elements required to drive only one or more specific finctional elements particular to the specific needs of the vehicle; and configuring one or more control circuits to control the drive of each of said one or more specific output circuits;

producing one or more arbitral communication apparatus responsive to a sleep condition request to stop operation of the specific output circuit for a predetermined time period; and wherein communication is performed via the transmission path between said one or more essential communication apparatus and said one or more arbitral communication apparatus in response to an input signal from each of said input circuits of said one or more essential communication apparatus to control at least one of said essential output circuits and said specific output circuits.

18. The on-vehicle communication system of claim 17 wherein the essentially-mounted communication apparatus includes a plurality of output circuits adapted to drive output elements commonly used on all vehicle types.

19. The manufacturing method for the communication system of claim 17, wherein at least two arbitrarily mounted communication apparatus are optionally selected to be mounted on the vehicle in accordance with the needs of the vehicle type.

* * * * *